United States Patent Office 3,488,380
Patented Jan. 6, 1970

3,488,380
CARBAMATE ESTERS AND THEIR METHOD OF PREPARATION
David L. Goldhamer, Cedar Grove, Armin G. Wilson, Highland Park, and Leonard Weintraub, South River, N.J., assignors to Bristol-Myers Company, New York, N.Y., a corporation of Delaware
No Drawing. Filed Mar. 30, 1966, Ser. No. 538,615
Int. Cl. C07c 101/74, 69/84, 125/00
U.S. Cl. 260—471                     12 Claims

ABSTRACT OF THE DISCLOSURE

A compound selected from the group consisting of symmetrical and unsymmetrical and mixed carbamate esters of salicylic acid and esters of the formula:

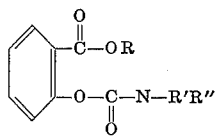

wherein R is selected from the group consisting of hydrogen, alkyl, aryl and aralkyl, and wherein R' and R" are alkyl, aryl or aralkyl.

---

This invention relates to certain novel carbamate esters of salicylic acid compounds or salicylic acid ester compounds and to processes for their preparation. More particularly, the novel carbamate compounds of interest herein are described by the formula:

(1)
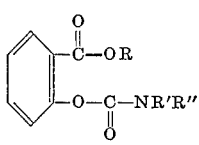

wherein R is selected from the group consisting of hydrogen, alkyl, aryl and aralkyl; and R' and R" are selected from the group consisting of alkyl, aryl and aralkyl; it being understood that R, R' and R" may be the same or different alkyl, aryl or aralkyl radicals. R, when it is other than hydrogen, R' and R" are preferably hydrocarbon radicals.

The compounds of the present invention are useful as analgesics, antiinflammatories and antipyretics. Moreover, they are generally oil-soluble and accordingly can readily be incorporated in fatty vehicles for topical application.

The carbamate esters of the salicylic acid esters of this invention can be prepared by reacting the appropriate ester of salicylic acid or a salt thereof with the appropriate carbamoyl chloride in the presence of an organic solvent. This reaction may be illustrated by the following equation:

(2)
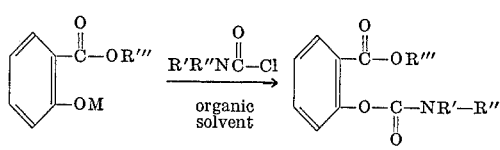

wherein R''', R' and R" are selected from the group consisting of alkyl, aryl and aralkyl as defined above, and M is hydrogen or a metal, such as an alkali metal.

The salicylic acid esters used as reactants in the process of Equation 2 above can be prepared in any suitable manner. A typical synthesis is illustrated in the equation below:

(3)
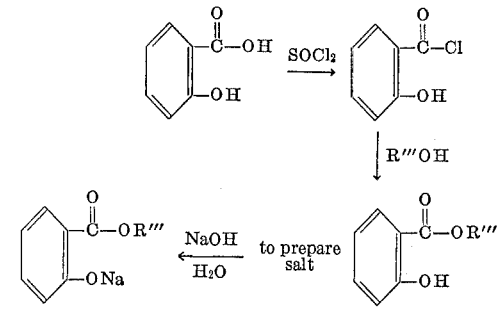

wherein R has the value ascribed to it above in connection with Equation 2.

The carbamate esters of the salicylic acid compounds of this invention can be prepared by the hydrogenolysis of carbamate esters of salicylic ester compounds of formula:

(4)
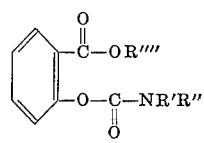

in which R'''' is a radical readily hydrolyzable from its oxygen linkage and R' and R" have the same value ascribed to them above. R'''' likewise will ordinarily also be selected from the group consisting of alkyl, aryl and aralkyl radicals. In a typical process of this type an ester of Formula 4 above, dispersed or dissolved in a solvent is hydrogenated in the presence of a hydrogenation catalyst. Any of a variety of well-known hydrogenation catalysts may be used for this purpose. One type that has been found to be quite suitable is the palladium on charcoal.

In a preferred form of this process, the ester employed is a benzhydryl compound described by the formula:

(5)
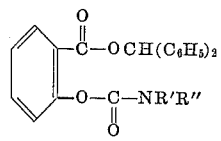

in which R' and R" have the formula ascribed to them above. This ester, dissolved in an organic solvent, i.e., one solvent or a combination of solvents, is hydrogenated in the presence of a hydrogenation catalyst, e.g., palladium on carbon.

The present invention encompasses the symmetrical, unsymmetrical and mixed carbamate esters of salicylic acid and salicylic acid esters. Thus, although R, R' and R" in Formula 1 are different symbols, they may represent the same radical, e.g., R, R' and R" may all be methyl. Furthermore, two of R, R' and R" may have the same significance, whereas the third may be different. For example, R may represent hydrogen or isopropyl and R' and R" may each represent ethyl. Moreover, R, R' and R" may each represent a different group, e.g., R may be propyl, R' ethyl and R" methyl.

When R, R' or R" in Formula 1 above is alkyl, it ordinarily will not exceed 12 carbon atoms. In the preferred form of this invention, R, R' or R" may be lower alkyl, e.g., methyl, ethyl, propyl, isopropyl, n-butyl, sec.-butyl, isobutyl, t-butyl.

When R, R' or R" is aryl or aralkyl in Formula 1 above, it is preferably phenyl or substituted phenyl, or benzyl or substituted benzyl, having up to about 19 carbon atoms. By way of illustration, in addition to phenyl and benzyl falling within this category, there may also be mentioned: benzhydryl and triphenylmethyl.

As noted previously, compounds of the present invention can be prepared by reacting the materials shown in Equation 2 in an organic solvent, preferably in the absence of water. A variety of solvents can be used for this purpose. Among these there may be mentioned dimethyl sulfoxide, pyridine, etc. However, where the alkali-metal salt of the salicylic acid ester is employed, the solvent is preferably dimethyl sulfoxide.

Similarly, as noted above, the processes of this invention involving the hydrogenolysis of compounds of Formula 4 or 5 above can be carried out in an organic solvent. Any organic solvent, including a combination of solvents, which are inert to the reactants and principal reaction product and in which the reactants are soluble can be employed. A combination of ethyl alcohol and ethyl acetate has been found to be quite suitable for this purpose.

The following examples are further illustrative of the present invention. It should be understood, however, that the invention is not limited thereto.

EXAMPLE 1

Preparation of t-butyl N,N-dimethylcarbamoylsalicylate

The dried sodium salt of t-butyl salicylate (50 g., 0.232 mole) is dissolved in 315 ml. of anhydrous dimethyl sulfoxide in a liter, 3-neck flask equipped with a stirrer, condenser, drying tube thermometer and addition funnel. To the solution is added dropwise 27.4 g. (0.255 mole) of dimethyl carbamoyl chloride. The mixture is heated at 45° C. for 4 hours. On cooling, the solution is swamped with a liter of ice and water. The mixture is well-extracted with ether and extracted again after salt is added. The combined extracts are dried over sodium sulfate. Evaporating the ether solution in vacuo gives 54.6 g. of white solid. The solid is recrystallized from hexane yielding 37.6 g. (61.2%), M.P. 43°–44.5° C.

Analysis.—Calculated: C, 63.38; H, 7.22; N, 5.28. Found: C, 63.58; H, 7.03; N, 5.38.

EXAMPLE 2

Preparation of methyl N,N-dimethylcarbamoylsalicylate

Into a one-liter, three-neck flask equipped with a stirrer, thermometer, condenser, drying tube and addition funnel is placed 128 ml. (1.0 mole) of methyl salicylate and 242 ml. (3.0 moles) of anhydrous pyridine. Dimethyl carbamoyl chloride, 160.5 g. (1.50 mole) is slowly introduced into the mixture through an addition funnel. The mixture is stirred for 24 hours at 45–50° C. Upon cooling, the solution is acidified with a hydrochloric acid, ice-water mixture. The aqueous layer is extracted several times with ether, and the ether extracts are dried over sodium sulfate. Evaporation of the ether in vacuo gives 137.8 g. of a crude pale yellow reaction product. Fractional distillation at 143–145° C. (1.3 mm.) gives 53.9 g. of methyl N,N-dimethylcarbamoylsalicylate (24.2%).

Analysis.—Calculated: C, 59.18; H, 5.87; N, 6.28. Found: C, 59.37; H, 5.95; N, 6.38.

EXAMPLE 3

Preparation of benzyl N,N-dimethylcarbamoylsalicylate

The benzyl ester of salicylic acid (67.8 g., 0.30 mole) is treated with 64.2 g. (0.60 mole) of dimethyl carbamoyl chloride in the presence of 47 g. (0.60 mole) of anhydrous pyridine. The solution is heated to 45° C. for about 21 hours. The mixture is worked up by pouring it into ice-water containing 400 ml. of concentrated hydrochloric acid. A white solid precipitates. The precipitate is filtered and washed with petroleum ether. The aqueous layer is extracted several times with ether. The ether extracts, and petroleum ether washings are combined and dried over sodium sulfate. The solvents are evaporated in vacuo and the resulting low melting solid is triturated with petroleum ether several times. This solid is combined with the precipitate and recrystallized twice from a mixture of petroleum ether and cyclohexane, giving 44.4 g. (49.5%), M.P. 60.5°–62.5° C.

Analysis.—Calculated: C, 68.21; H, 5.73; N, 4.68. Found: C, 68.20; H, 5.78; N, 4.64.

EXAMPLE 4

Preparation of t-butyl N,N-diphenylcarbamoylsalicylate

Into a 500 ml. three-neck flask equipped with a thermometer, stirrer, condenser, drying tube and addition funnel is placed 43 g. (0.20 mole) of the sodium salt of t-butyl salicylate. The salt is dissolved in 250 ml. of dried dimethyl sulfoxide. To this solution is added dropwise 46.2 g. (0.20 mole) of diphenylcarbamoyl chloride in 100 ml. of dimethyl sulfoxide. The mixture is heated at about 45° for 4 hours. The solution is swamped with ice-water. A white solid precipitates but becomes gummy and is extracted with several portions of ether. After drying the ether layer over sodium sulfate and evaporating the solvent in vacuo, there remains a white crystalline solid. The solid is recrystallized from 95% ethanol giving 26.7 g. (34.4%), M.P. 102.5–103° C.

Analysis.—Calculated: C, 74.02; H, 5.95; N, 3.60. Found: C, 73.73; H, 6.09; N, 3.39.

EXAMPLE 5

Preparation of benzhydryl N,N-dimethylcarbamoyl-
salicylate

Into a 250 ml. three-neck flask equipped with a stirrer, condenser, addition funnel thermometer and drying tube is placed 25.3 g. (0.083 mole) of benzhydryl salicylate in 90 ml. of anhydrous pyridine. To the solution is added 18.2 g. (0.17 mole) of dimethylcarbamoyl chloride. The mixture is stirred for approximately 4 hours at ambient temperature and then swamped with 125 ml. of concentrated hydrochloric acid in two liters of water. A white solid, tinged with pink, precipitates and is filtered. The aqueous layer is extracted several times with a saturated solution of sodium bicarbonate and finally with brine. After drying the ether extracts over sodium sulfate, the ether is evaporated in vacuo and a white solid remains. Both solids are combined, triturated with petroleum ether, and then recrystallized from a mixture of petroleum ether and ethyl acetate, giving 18.4 g. (61.5%), M.P. 92.5–93.5° C.

Analysis.—Calculated: C, 73.58; H, 5.64; N, 3.73. Found: C, 73.71; H, 5.63; N, 3.77.

Following the procedures outlined above using the appropriate salicylic acid ester and the appropriate carbamoyl chloride, the following products are prepared:

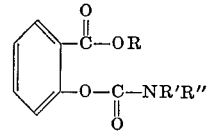

| Example | R | R′ | R″ |
| --- | --- | --- | --- |
| 6 | benzyl | methyl | methyl |
| 7 | t-butyl | phenyl | phenyl |
| 8 | ethyl | methyl | methyl |
| 9 | propyl | methyl | methyl |
| 10 | isopropyl | methyl | methyl |
| 11 | n-butyl | methyl | methyl |
| 12 | sec.-butyl | methyl | methyl |
| 13 | isobutyl | methyl | methyl |
| 14 | phenyl | methyl | methyl |
| 15 | benzhydryl | methyl | methyl |
| 16 | ethyl | ethyl | ethyl |
| 17 | propyl | ethyl | ethyl |
| 18 | isopropyl | ethyl | ethyl |
| 19 | phenyl | ethyl | ethyl |
| 20 | benzhydryl | ethyl | ethyl |
| 21 | propyl | propyl | propyl |
| 22 | sec.-butyl | propyl | propyl |
| 23 | isobutyl | propyl | propyl |
| 24 | ethyl | ethyl | methyl |
| 25 | propyl | ethyl | methyl |
| 26 | benzyl | ethyl | methyl |
| 27 | phenyl | ethyl | methyl |
| 28 | benzhydryl | methyl | ethyl |
| 29 | phenyl | methyl | ethyl | propyl | ethyl |

EXAMPLE 30

Preparation of N,N-dimethylcarbamoylsalicylic acid

Benzhydryl N,N - dimethylcarbamoylsalicylate (30 g., 0.08 mole) is dissolved in a solution of 130 ml. of ethyl acetate and 20 ml. of absolute ethanol and placed in a 500 cc. pressure bottle. This mixture is flushed with argon and then 2.0 g. of 10% palladium on charcoal s added. The bottle is attached to a Parr apparatus and hydrogenated (50 p.s.i.g.) at room temperature with shaking. Hydrogenolysis is completed in less than two hours. The catalyst is filtered and solvent is evaporated to give a crude oil. A white solid precipitates when the oil is suspended in cold petroleum ether. The solid is suction-filtered and washed with additional quantities of petroleum ether. Recrystallization from carbon tetrachloride gives 24.5 g. (83.8%) of N,N-dimethylcarbamoylsalicylic acid, M.P. 71° C. (d.).

*Analysis.*—Calculated: C, 57.41; H, 5.30; N, 6.70. Found: C, 57.13; H, 5.37; N, 6.56.

Although the invention has been described with reference to specific forms thereof, it will be understood that many changes and modifications may be made without departing from the spirit of this invention.

What is claimed is:

1. As a composition of matter, a compound selected from the group consisting of symmetrical, unsymmetrical and mixed carbamate esters of salicylic acid and esters of the formula:

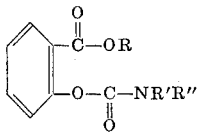

wherein R is selected from the group consisting of hydrogen, alkyl, aryl and aralkyl, and wherein each of R' and R" is selected from the group consisting of alkyl, aryl, and aralkyl; R, R' and R" being the same or different from each other; said alkyl not exceeding 12 carbon atoms and said aryl and aralkyl not exceeding 19 carbon atoms.

2. A composition according to claim 1 wherein R, R' and R" are each alkyl.

3. A composition according to claim 1 wherein R is aralkyl, R' is alkyl and R" is alkyl.

4. A composition according to claim 1 wherein R is hydrogen or alkyl, and R' and R" are aryl.

5. A composition according to claim 1 wherein R, R' and R" are each aryl.

6. A composition according to claim 1 wherein each of R, R' and R" is the same alkyl.

7. A composition according to claim 1 wherein R is t-butyl, and R' and R" are methyl.

8. A composition according to claim 1 wherein R, R' and R" are methyl.

9. A composition according to claim 1 wherein R is benzyl, and R' and R" are methyl.

10. A composition according to claim 1 wherein R is t-butyl and R' and R" are phenyl.

11. A composition according to claim 1 wherein R is hydrogen and R' and R" are alkyl.

12. A process for preparing carbamate esters of salicylic acid of formula:

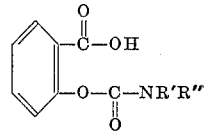

which comprises hydrogenating with molecular hydrogen in solution a carbamate ester of a salicylic acid ester of formula:

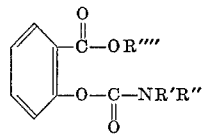

until substantial reaction takes place; wherein R' and R" are selected from the group consisting of alkyl, aryl and aralkyl, and R'''' is a radical readily hydrolyzable from its oxygen linkage and selected from the group consisting of alkyl, aryl and aralkyl; said alkyl not exceeding 12 carbon atoms and said aryl or aralkyl not exceeding 19 carbon atoms.

References Cited

Fieser et al., Organic Chemistry, 3rd edition (1956), Reinhold Pub. Corp. QO257F5.

Organic Chemistry, by Turner et al. (1952), p. 460 relied upon.

LORRAINE A. WEINBERGER, Primary Examiner

L. A. THAXTON, Assistant Examiner

U.S. Cl. X.R.

260—389, 474, 480, 999